US010830474B2

(12) United States Patent
Brahme et al.

(10) Patent No.: US 10,830,474 B2
(45) Date of Patent: Nov. 10, 2020

(54) SYSTEMS AND METHODS OF PREDICTING ENERGY USAGE

(71) Applicant: Lennox Industries Inc., Richardson, TX (US)

(72) Inventors: Rohini Brahme, Irving, TX (US); Peter Hrejsa, Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 7 days.

(21) Appl. No.: 16/182,273

(22) Filed: Nov. 6, 2018

(65) Prior Publication Data

US 2020/0141603 A1  May 7, 2020

(51) Int. Cl.
| | | |
|---|---|---|
| *F24F 11/46* | (2018.01) | |
| *F24F 11/64* | (2018.01) | |
| *F24F 11/65* | (2018.01) | |
| *G05B 13/04* | (2006.01) | |
| *F24F 140/60* | (2018.01) | |
| *F24F 110/12* | (2018.01) | |
| *F24F 130/10* | (2018.01) | |
| *F24F 140/50* | (2018.01) | |
| *F24F 110/10* | (2018.01) | |

(52) U.S. Cl.
CPC .............. *F24F 11/46* (2018.01); *F24F 11/64* (2018.01); *F24F 11/65* (2018.01); *G05B 13/048* (2013.01); *F24F 2110/10* (2018.01); *F24F 2110/12* (2018.01); *F24F 2130/10* (2018.01); *F24F 2140/50* (2018.01); *F24F 2140/60* (2018.01)

(58) Field of Classification Search
CPC .. F24F 11/46; F24F 11/65; F24F 11/64; F24F 2140/50; F24F 2140/60; F24F 2110/10; F24F 2110/12; F24F 2130/10; G05B 13/048
See application file for complete search history.

(56) References Cited

U.S. PATENT DOCUMENTS 8,172,153 B1 * 5/2012 Kennedy ............. F24D 19/1048
236/1 B
9,148,018 B2 * 9/2015 Suyama .................... H02J 3/32
(Continued)

OTHER PUBLICATIONS

U.S. Appl. No. 15/967,848, filed May 1, 2018, Joy et al.
U.S. Appl. No. 15/980,182, filed May 15, 2018, Brahme et al.

*Primary Examiner* — Charles R Kasenge
(74) *Attorney, Agent, or Firm* — Baker Botts L.L.P.

(57) ABSTRACT

A method for operating a heating, ventilation, and air condition ("HVAC") system includes determining a current temperature of the enclosed space and receiving a first comfort temperature. The method further including determining, based on a selection of a time period, a first consumption value indicating a predicted amount of energy required to maintain the first comfort temperature for the time period, wherein the first consumption value is determined based at least on a first predicted value and a second predicted value, the first predicted value being indicative of an amount of energy required to condition the enclosed space to the first comfort temperature from the current temperature and the second predicted value being indicative of an amount of energy required to, upon conditioning the enclosed space to the first comfort temperature, maintain the first comfort temperature for the time period.

17 Claims, 4 Drawing Sheets

(56) References Cited

U.S. PATENT DOCUMENTS

| | | | | |
|---|---|---|---|---|
| 9,235,657 B1* | 1/2016 | Wenzel | ............... | G06F 17/50 |
| 9,436,179 B1* | 9/2016 | Turney | ............... | G05B 23/02 |
| 9,852,481 B1* | 12/2017 | Turney | ............... | G06Q 20/145 |
| 10,007,259 B2* | 6/2018 | Turney | ............... | G05B 23/02 |
| 2007/0043478 A1* | 2/2007 | Ehlers | ............... | F24F 11/30 |
| | | | | 700/276 |
| 2010/0217451 A1* | 8/2010 | Kouda | ............... | G06Q 50/06 |
| | | | | 700/291 |
| 2011/0051325 A1* | 3/2011 | Kawasaki | ............... | H02J 3/06 |
| | | | | 361/631 |
| 2013/0173064 A1* | 7/2013 | Fadell | ............... | G01J 5/041 |
| | | | | 700/276 |
| 2015/0285527 A1* | 10/2015 | Kim | ............... | F24F 11/64 |
| | | | | 700/276 |
| 2016/0195866 A1* | 7/2016 | Turney | ............... | G05B 23/02 |
| | | | | 700/291 |
| 2016/0305678 A1* | 10/2016 | Pavlovski | ............... | G05B 13/048 |
| 2016/0333638 A1* | 11/2016 | Cascia | ............... | E06B 9/38 |
| 2016/0364313 A1* | 12/2016 | Roth | ............... | G06F 11/3058 |
| 2017/0075568 A1* | 3/2017 | Bentz | ............... | G06Q 50/06 |
| 2017/0076263 A1* | 3/2017 | Bentz | ............... | G05B 19/042 |
| 2017/0108915 A1* | 4/2017 | Hong | ............... | G06F 1/3287 |
| 2017/0211830 A1* | 7/2017 | Kosaka | ............... | G05B 15/02 |
| 2018/0073775 A1* | 3/2018 | Cascia | ............... | G05B 15/02 |
| 2018/0075549 A1* | 3/2018 | Turney | ............... | G06Q 20/145 |
| 2019/0178518 A1* | 6/2019 | Zimmerman | ............... | F24F 11/58 |

* cited by examiner

SYSTEMS AND METHODS OF PREDICTING ENERGY USAGE

TECHNICAL FIELD

This disclosure relates generally to operating a heating, ventilation, and air conditioning ("HVAC") system. More specifically, this disclosure relates to a system and method of predicting the energy usage of an HVAC system based on a predicted condition of an enclosed space.

BACKGROUND

Heating, ventilation, and air conditioning ("HVAC") systems can be used to regulate the environment within an enclosed space. Typically, an air blower is used to pull air from the enclosed space into the HVAC system through ducts and push the air back into the enclosed space through additional ducts after conditioning the air (e.g., heating, cooling or dehumidifying the air). Various types of HVAC systems, such as residential and commercial, may be used to provide conditioned air for enclosed spaces.

Each HVAC system typically includes a HVAC controller that directs the operation of the HVAC system. The HVAC controller can direct the operation of a conditioning unit, such as an air conditioner or a heater, to control the temperature of the enclosed space.

SUMMARY OF THE DISCLOSURE

According to one embodiment, a method for a heating, ventilation, and air condition ("HVAC") system, the method includes determining, by at least one controller of the HVAC system, a current temperature of the enclosed space and receiving, by the at least one controller, a first comfort temperature indicating a first desired temperature of the enclosed space. The method further including determining, by the at least one controller, based on a selection of a time period, a first consumption value indicating a predicted amount of energy required to maintain the first comfort temperature for the time period, wherein the first consumption value is determined based at least on a first predicted value and a second predicted value, the first predicted value being indicative of an amount of energy required to condition the enclosed space to the first comfort temperature from the current temperature, the first predicted value being calculated based at least on a predicted condition of the enclosed space and the first comfort temperature, and the second predicted value being indicative of an amount of energy required to, upon conditioning the enclosed space to the first comfort temperature, maintain the first comfort temperature for the time period, the second predicted value being calculated based at least on the first comfort temperature and forecasted weather data According to another embodiment, a controller for a heating, ventilation, and air condition ("HVAC") system, the controller comprises processing circuitry and a computer readable storage medium comprising instructions that, when executed by the processing circuitry, cause the controller to determine a current temperature of an enclosed space and receive a first comfort temperature indicating a first desired temperature of the enclosed space. The controller further comprises instructions that, when executed by the processor, cause the controller to determine, based on a selection of a time period, a first consumption value indicating a predicted amount of energy required to maintain the first comfort temperature for the time period, wherein the first consumption value is determined based at least on a first predicted value and a second predicted value, the first predicted value being indicative of an amount of energy required to condition the enclosed space to the first comfort temperature from the current temperature, the first predicted value being calculated based at least on a predicted condition of the enclosed space and the first comfort temperature, and the second predicted value being indicative of an amount of energy required to, upon conditioning the enclosed space to the first comfort temperature, maintain the first comfort temperature for the time period, the second predicted value being calculated based at least on the first comfort temperature and forecasted weather data.

According to yet another embodiment, a heating, ventilation, and air condition ("HVAC") system operable to condition an enclosed space includes one or more heating components operable to heat the enclosed space when the HVAC system is in a heating mode, one or more cooling components operable to cool the enclosed space when the HVAC system is in a cooling mode, and a controller. The controller further includes processing circuitry and a computer readable storage medium comprising instructions that, when executed by the processing circuitry, cause the controller to determine a current temperature of an enclosed space and receive a first comfort temperature indicating a first desired temperature of the enclosed space. The controller further comprises instructions that, when executed by the processor, cause the controller to determine, based on a selection of a time period, a first consumption value indicating a predicted amount of energy required to maintain the first comfort temperature for the time period, wherein the first consumption value is determined based at least on a first predicted value and a second predicted value, the first predicted value being indicative of an amount of energy required to condition the enclosed space to the first comfort temperature from the current temperature, the first predicted value being calculated based at least on a predicted condition of the enclosed space and the first comfort temperature, and the second predicted value being indicative of an amount of energy required to, upon conditioning the enclosed space to the first comfort temperature, maintain the first comfort temperature for the time period, the second predicted value being calculated based at least on the first comfort temperature and forecasted weather data.

Certain embodiments may provide one or more technical advantages. For example, an embodiment of the present disclosure may predict energy consumption for an HVAC unit operating at a comfort temperature for a certain time period. As another example, an embodiment of the present invention may select one of a plurality of comfort temperatures to operate at based on a comparison of predicted energy consumption for a particular period of time. This disclosure recognizes certain advantages of predicting such information. For example, predicting energy consumption may result in an operator operating his/her HVAC system more efficiently, which in turn may result in a decreased demand of a supplying power grid. When a large number of HVAC systems use the energy-saving techniques described herein, the decrease in energy demand may have a significant effect in the aggregate. Another advantage of certain embodiments includes predicting energy consumption for different comfort temperatures, determining a cost associated with each predicted energy consumption, and enabling the user to select a comfort temperature based on cost. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
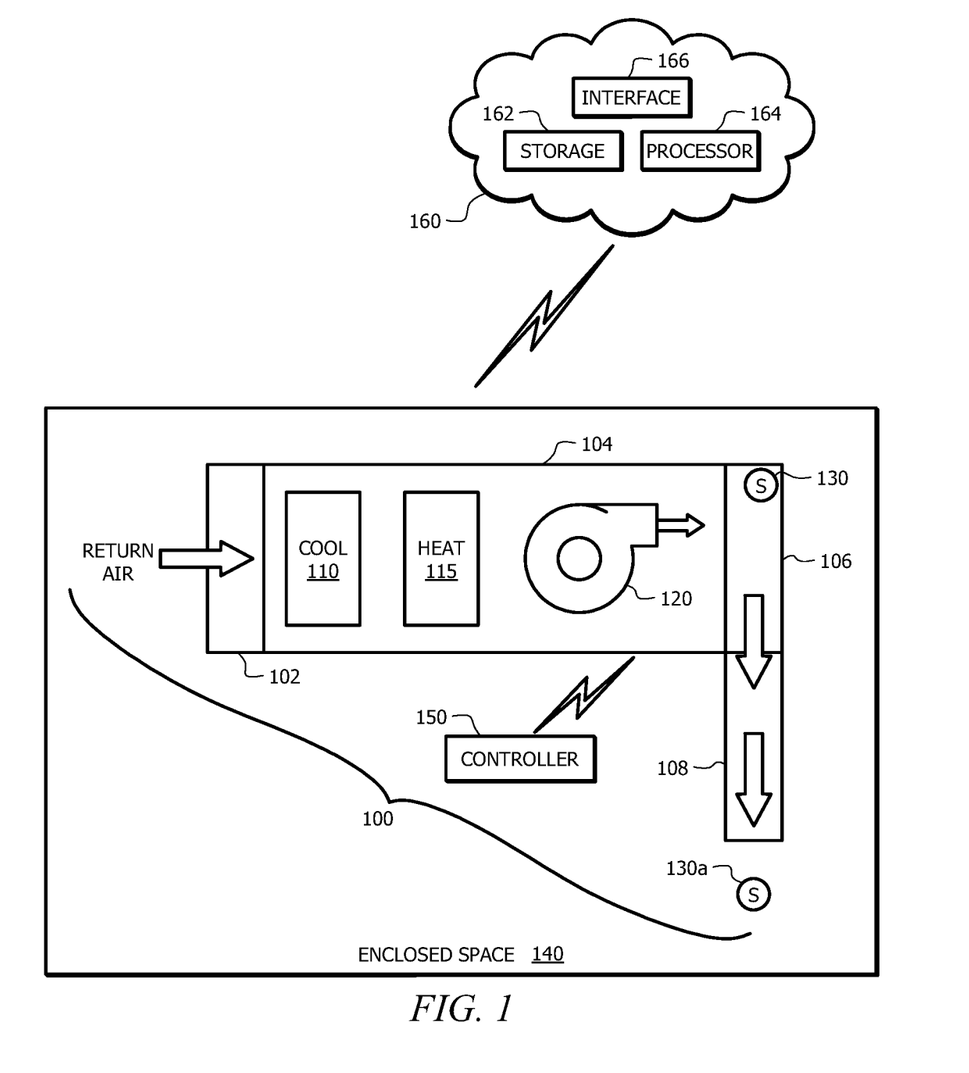
FIG. 1 illustrates an example of a heating, ventilation, and air condition ("HVAC") system operable to provide conditioned air to an enclosed space, according to certain embodiments.
Figure 2A:
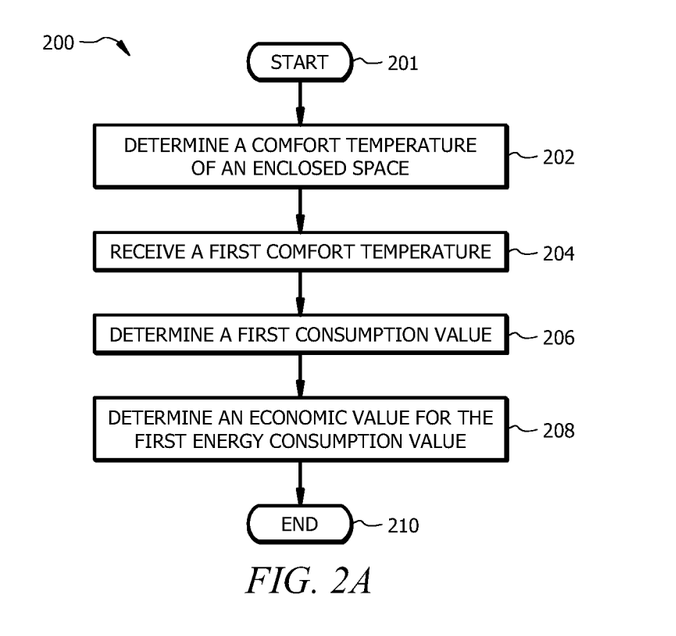
FIG. 2A is a flow chart illustrating a method of operation for the HVAC system of FIG. 1, according to certain embodiments.
Figure 2B:
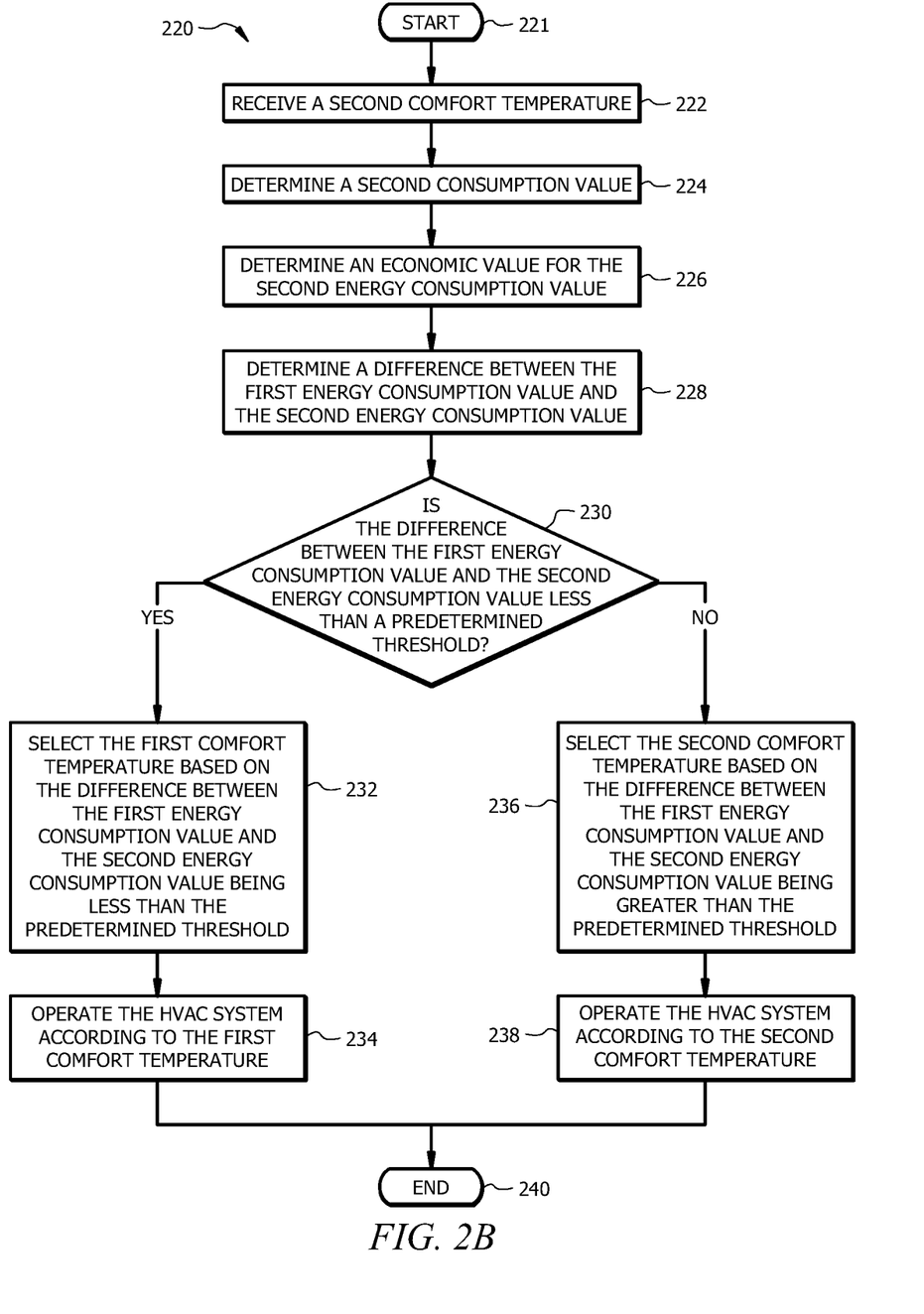
FIG. 2B is a flow chart illustrating a method of operation for the HVAC system of FIG. 1, according to certain embodiments.
Figure 3:
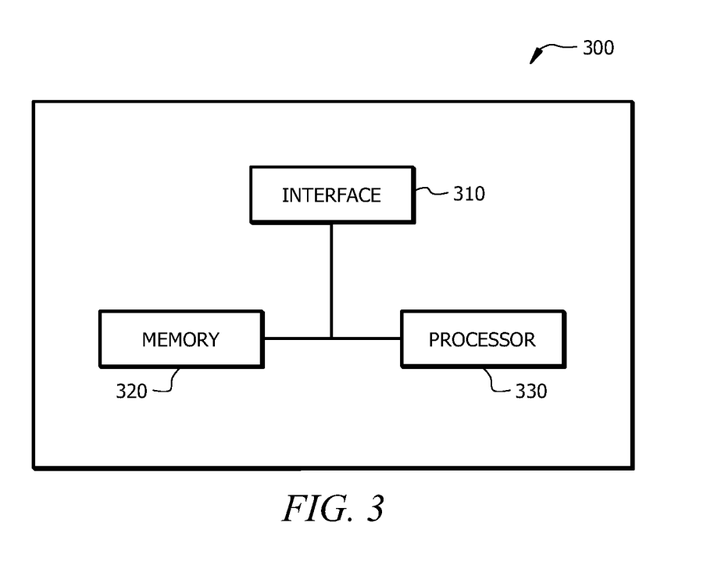
FIG. 3 illustrates an example of a controller for the HVAC system of FIG. 1, according to certain embodiments.

Embodiments of the present disclosure and its advantages are best understood by referring to FIGS. 1 through 3 of the drawings, like numerals being used for like and corresponding parts of the various drawings.

Conventional HVAC systems are not currently configured to predict future energy consumption and/or the cost of energy consumption. Indeed, the traditional way of determining these values is a guestimate based on historical weather data and past utility bills. For example, in order to estimate how much electricity an operator may consume by operating his/her HVAC system in June 2019 in Dallas, Tex., the operator may rely on a previous electricity bill for the month of June 2018 in Dallas, Tex. and add or subtract kilowatts based on whether June 2019 is forecasted to be hotter or cooler than June 2018. Such estimation may be inaccurate for a number of reasons. For example, the HVAC unit could be experiencing issues in June 2019 that it did not experience in June 2018. As another example, the energy rate may be different in June 2019 than it was in June 2018. As yet another example, operator may have decided to operate the HVAC system at a different comfort set point in June 2019 than he/she had in June 2018. Thus, such method of predicting energy consumption and/or cost of energy consumption can be improved.

An energy consumer may desire a more accurate prediction of energy consumption and/or cost of energy consumption for any number of reasons. As an example, a consumer may wish to know an accurate estimation of energy consumption costs for financial planning purposes. As another example, a consumer may wish to determine whether he/she is operating his/her HVAC system in a cost effective and/or energy efficient manner. Today, electricity consumers generally operate their HVAC systems based on an evaluation of comfort and cost concerns. For example, an individual who is comfortable in temperatures between 70° F.-74° F. may determine that, for cost and efficiency purposes, it is in his/her best interest to operate the HVAC system at the high or low end of the comfort range in view of the ambient temperature (e.g., operate the HVAC system at a comfort temperature of 74° F. during the summertime and a comfort temperature of 70° F. during the wintertime). An individual may make these determinations based on a general understanding that it is costlier (in terms of energy consumption and economics) to achieve a particular comfort temperature during peak season relative to non-peak season due to the increased load placed on his/her HVAC system. This generalized understanding, however, may cause a person to cede comfort when doing so has minimal or no effect on the actual cost of electricity.

Currently, HVAC systems are unable to predict the cost to the consumer for operating an HVAC system at one temperature for a particular time period. For example, conventional HVAC systems cannot predict the cost to operate a first user's HVAC system at a comfort temperature of 73° F. for the month of June. Conventional HVAC systems also lack the intelligence to predict the cost of operating an HVAC system at one temperature for a specific period of time as compared to operating the HVAC system at another temperature for the same time period. For example, conventional HVAC systems are currently unable to predict that operating a system at a comfort temperature of 75° F. for the month of June rather than operating the HVAC system at a comfort temperature of 73° F. may result is electricity savings of $75.00. As another example, conventional HVAC systems are currently unable to predict that operating an HVAC system at a comfort temperature of 75° F. for the month of August rather than operating the HVAC system at a comfort temperature of 73° F. may only result in electricity savings of $5.00.

One advantage of the present disclosure is to predict energy consumption and calculate electricity costs based on the predicted energy consumption such that the consumer may determine whether an occupant's comfort is worth the cost to supply such comfort. As a result of providing consumers with predicted electricity cost data, consumers may decide to operate their devices (e.g., an HVAC system) more efficiently (e.g., by increasing or decreasing their comfort temperatures during peak seasons). As a result, demand for power may decrease, thereby relieving stress placed on the power grids supplying such energy.

Another advantage realized by the present disclosure is that an electricity consumer may determine whether to take advantage of an electricity provider promotion that seeks to compensate a consumer for decreased energy consumption. This may be the case, for example, when electricity providers attempt to alleviate stress on a power grid by encouraging consumers to set their thermostats to X for a period of Y in exchange for $Z. Previously, consumers had no means to gauge whether $Z is sufficient reparation for the discomfort they would endure by setting their thermostats to X. Consumers may now, using the system and methods disclosed herein, make a more informed decision. For example, using the system and methods disclosed herein, a consumer may estimate the cost savings resulting from setting their thermostat to X and calculate a total incentive value by summing together $Z and the estimated cost savings (difference between predicted cost of operating the HVAC system at X° F. rather than W° F.). In some cases, the consumer may determine that the total incentive value is not worth setting the thermostat to X for Y (e.g., the month of June). As an example, the consumer may determine that it is not in his/her best interest to increase his/her comfort temperature by 7° F. (e.g., from 73° F. to 80° F.) for an entire month if the total incentive value is $18.00 (e.g., if Z is $10.00 and the estimated cost savings is $8.00). In other cases, the consumer may determine that the total incentive value is worth setting the thermostat to X for Y. For example, the consumer may determine to accept the promotion of the electricity provider when the total incentive value is $45.00 (e.g., if Z is $40.00 and the estimated cost savings is $5.00)

and the consumer must only increase his/her comfort temperature by 2° F. (from 73° F. to 75° F.).

Generally, this disclosure recognizes configuring an HVAC system to predict energy consumption based on forecasted weather data and desired comfort temperatures. Upon predicting energy consumption, the HVAC system may calculate estimated electricity charges based on the then-current rate of electricity. The HVAC system disclosed herein may further calculate savings associated with changes in comfort temperature and/or determine an energy efficient and/or cost-effective operation schedule for the HVAC system in view of the desired comfort temperature.

FIG. 1 illustrates an example of an HVAC system 100. HVAC system 100 includes a return duct 102, a return plenum 104, a supply duct 106 and a supply plenum 108. Additionally, HVAC system 100 includes conditioning systems for cooling and heating air in an enclosed space 140. The conditioning systems include a cooling system or cooling source 110 and a heating system or heating source 115. The cooling system 110 can include a refrigeration circuit having a compressor system, evaporator coils and condenser coils fluidly coupled together. The cooling system 110 represents a single cooling stage of the HVAC system 100. Given the teachings herein, one skilled in the art will understand that this disclosure also applies to other HVAC embodiments having more than one cooling stage. The heating system 115 can include a gas furnace, electric heating elements, or even a combination thereof. The heating system 115 can also be multi-staged.

The HVAC system 100 also includes an indoor air blower 120, one or more sensors 130, and an HVAC controller 150. Given the teachings herein, one skilled in the art will also understand that HVAC system 100 may include additional components and devices that are not presently illustrated or discussed but are typically included in an HVAC system, such as, a power supply, an expansion valve, etc. Some illustrated components of HVAC system 100 may be contained within a single enclosure (e.g., a cabinet). In one embodiment, HVAC system 100 is a commercial system, such as a rooftop unit. HVAC system 100 can also be a residential system. In some embodiments, the heating and cooling sources for the HVAC system 100 do not operate until activated for conditioning.

The cooling system 110, the heating system 115 and the indoor air blower 120 may be conventional devices that are typically employed in HVAC systems. At least some of the operation of HVAC system 100 can be controlled by the HVAC controller 150 based on inputs from various sensors of the HVAC system 100. For example, the HVAC controller 150 can cause the indoor air blower 120 to move air across the cooling system 110 and into the enclosed space.

Sensors 130 are configured to sense information about the enclosed space and/or components of HVAC system 100. As an example, sensor 130 may include a temperature sensor configured to sense the current temperature of an enclosed space. As another example, sensor 130 may include a pressure sensor configured to sense the discharge pressure of a compressor of HVAC system 100. As yet another example, sensor 130 may include an occupancy status sensor configured to sense whether the enclosed space is occupied (e.g., by persons and/or animals). Information sensed by sensors 130 may be sent to controller 150 in some embodiments. In other embodiments, information sensed by sensors 130 may be sent to one or more cloud platforms (e.g., cloud platform 160). User interface 150 is configured to be an interface between a user and HVAC system 100. User interface 150 can be an HVAC device that has a primary function of communicating between HVAC system 100 and the user. In some embodiments, user interface 150 is a non-HVAC device, such as a smart phone, that includes an application which allows communication between a user and HVAC system 100. There may be multiple user interfaces 140 for HVAC system 100. In some embodiments, a temperature sensor 130a and user interface 150 can also be conventional devices. In one embodiment, temperature sensor 130a is a thermostat that also functions as a user interface for HVAC system 100.

HVAC controller 150 may include one or more processors (e.g., processor 330 of controller 300), such as microprocessors, configured to direct the operation of HVAC system 100. Additionally, HVAC controller 150 may include an interface (e.g., interface 310 of controller 300) and a memory (e.g., memory 320 of controller 300) coupled thereto. The interface may include multiple ports for transmitting and receiving data from at least other components or devices of the HVAC system 100, such as cooling system 110, heating system 115, blower 120, and sensors 130. The interface may be further configured to receive input from one or more sources (e.g., an operator of HVAC system 100, a manufacturer of HVAC system 100). As an example, the interface may receive one or more comfort temperatures indicating a desired temperature of an enclosed space (e.g., enclosed space 140). As another example, the interface may receive one or more time periods. As contemplated herein, a time period may be defined in various manners such as a period of hours for one or more particular days and/or a range of time as identified in terms of days, weeks, months, or years. In some embodiments, each time period is associated with a particular comfort temperature. For example, the interface may receive a first comfort temperature of 70° F. associated with a first time period of one week. The one or more values received via the interface may be saved to a memory of HVAC controller 150. The memory of controller 150 may be a conventional memory that is constructed to store data and computer programs, including data and programs to provide functionality as disclosed herein. As an example, HVAC controller may be configured to save the values indicted in TABLE 1 below:

TABLE 1

| Comfort Temperature | Time period |
| --- | --- |
| 75° F. | Monday-Friday, 8AM-5PM |
| 70° F. | Sunday-Saturday, 5:01PM-7:59AM |
| 72° F. | Saturday & Sunday, 8AM-5PM |
| 77° F. | 1 Week |
| 73° F. | 2 Weeks |
| 74° F. | 1 Month |

As illustrated in FIG. 1, HVAC controller 150 is coupled to the various components of the HVAC system 100. In some embodiments, the connections therebetween are through a wired-connection. A conventional cable and contacts may be used to couple the HVAC controller 150 to the various components of HVAC system 100 via the controller interface. In other embodiments, a wireless connection may also be employed to provide at least some of the connections. HVAC controller 150 may also be communicably coupled to one or more cloud platforms 160 configured to store and/or execute instructions corresponding to one or more functions disclosed herein.

In one embodiment, the HVAC controller 150 is configured to operate both the cooling system 110 and the heating system 115 of the HVAC system 100 based on one or more comfort temperatures. As such, HVAC controller 150 and/or cloud platform 160 is configured to determine if either a heat source or a cooling source for the HVAC system is needed. As will be explained in further detail below, controller 150 may operate components of HVAC system 100 according to a user's selection of one or more of a comfort temperature and a time period. In other embodiments, controller 150 may operate components of HVAC system 100 according to a difference in the energy consumption values associated with two different comfort temperatures.

As disclosed in FIG. 1, one or more components of HVAC system 100 may be communicably coupled to cloud platform 160. Cloud platform may include, as depicted in FIG. 1, at least one storage device 162, at least one processor 164, and at least one interface 166. In some embodiments, storage device 162 stores computer-readable instructions for executing one or more functions described herein. Processor 164 of cloud platform 160 may execute any, some, or all of the instructions stored to storage device 162. Interface 166 may be configured to send and/or receive information. As an example, interface 166 may receive information from components of HVAC system 100 (e.g., sensors 130, controller 150) in order to determine, based on a time period, an energy consumption value indicating a predicted amount of energy required to maintain a comfort temperature. As another example, interface 166 may send information (e.g., operation schedule of HVAC system 100) to components of HVA system 100 (e.g., to controller 150).

As will be described in more detail below in reference to the method 200 of FIG. 2, this disclosure recognizes an intelligent HVAC system operable to predict energy consumption in an enclosed space (e.g., enclosed space 140) for a time period. As described herein, HVAC system 100 dynamically predicts the energy consumption in an enclosed space for a time period based on a predicted condition of the enclosed space. In some embodiments, predicting energy consumption may comprise determining the energy consumption required to condition the enclosed space to the comfort temperature and determining the energy consumption required to keep the enclosed space at the comfort temperature for the time period.

In some embodiments, HVAC system 100 is able to predict energy consumption by dynamically predicting a condition of enclosed space 140 at a future time. In some embodiments, predicting a condition of an enclosed space may be made by implementing systems and methods described in U.S. application Ser. No. 15/967,848. Accordingly, the disclosure of U.S. application Ser. No. 15/967,848 is hereby incorporated by reference. In other embodiments, predicting a condition of an enclosed space may be made using the existing logic of HVAC controller 150. For example, HVAC controller 150 may use the logic that dictates regular operation of HVAC system 100 in order to predict energy consumption. As recognized herein, "the logic that dictates regular operation of HVAC system 100" refers to the logic that an HVAC system 100 implements in order to maintain a comfort temperature within an enclosed space. Such logic may vary by manufacturer. For example, some HVAC manufacturers may program HVAC system 100 to operate based on a proportional and/or integral error determined by the system. Accordingly, this disclosure recognizes that existing HVAC logic may be used in conjunction with forecasted data to predict an energy consumption value associated with a particular comfort temperature. In some instances, this prediction is additionally based on system modeling. The prediction may account for energy usage associated with driving HVAC system 100 to a comfort temperature from the current temperature and maintaining the comfort temperature for a particular period of time.

HVAC system 100 may also be configured to determine an economic value for the energy consumption value. The economic value may be based on a predicted energy consumption value and an energy rate. Energy rate data may be received from any suitable source including but not limited to an operator or HVAC system 100, an energy provider of HVAC system 100 (e.g., utility company), and/or a manufacturer of HVAC system 100.

In certain embodiments, HVAC system 100 may determine a second energy consumption value required to maintain the enclosed space at a second selected comfort temperature for the time period. This may be beneficial when, for example, an operator seeks to determine whether it is more energy efficient and/or cost effective to operate HVAC system 100 at a different temperature. HVAC system 100 may also be configured to determine an economic value for the difference in the energy consumption values corresponding to each selected comfort temperature. For example, HVAC system 100 may be able to determine that it will cost $0.75 more to operate the HVAC system at the first comfort temperature than it would to operate the HVAC system at the second comfort temperature for the same time period. In some embodiments, HVAC system 100 automatically determines to operate HVAC system 100 at a first comfort temperature in response to determining that a difference in energy consumption, calculated based on predicted values of energy consumption corresponding to the first comfort temperature and the second comfort temperature, is less than a predetermined threshold (e.g., 50 kWh, $3.00). In some embodiments, controller 150 may further store (e.g., in memory 320 of controller 300) one or more predetermined values that may be used to make such determinations. Accordingly, this disclosure recognizes operation an HVAC system based on predicted energy consumption values.

FIG. 2 illustrates a method of operation for HVAC system 100. In some embodiments, the method 200 may be implemented by at least one controller of HVAC system (e.g., controller 150 of FIG. 1). In some embodiments, methods 200 and 220 are stored on computer readable medium, such as a memory of controller 150 (e.g., memory 320 of FIG. 3), as a series of operating instructions that direct the operation of a processor (e.g., processor 330 of FIG. 3). In other embodiments, method 300 is implement using components of cloud computing platform 160 (e.g., storage 162 and processor 164).

FIG. 2a illustrates a method of operation for an HVAC system (e.g., HVAC system 100 of FIG. 1). This disclosure recognizes that one or more steps of method 200 may be performed by a controller of the HVAC system (e.g., controller 150 of HVAC system 100). The method 200 may begin at step 201 and proceed to step 202. At step 202, HVAC system 100 determines a current temperature of enclosed space 140. HVAC system 100 may determine the current temperature of enclosed space 140 based on information received by sensor 130. For example, HVAC system 100 may determine that the current temperature of the enclosed space is 75° F. based on data sensed and relayed to controller 150 by sensor 130. In some embodiments, the method 200 proceeds to a step 204 upon determining the current temperature.

At step 204, HVAC system 100 receives a first comfort temperature (e.g., 71° F.) indicating a first desired temperature of enclosed space 140. As described above, the first comfort temperature may be received by an interface of controller 150. In some embodiments, the interface receives the first comfort temperature based on input from an operator of HVAC system 100. In other embodiments, the interface receives the first comfort temperature based on input from a manufacturer of HVAC system 100. The method 200 may proceed to a step 206 upon receiving the first comfort temperature.

At step 206, HVAC system 100 determines a first consumption value indicating a predicted amount of energy required to maintain the first comfort temperature for a particular time period. In some embodiments, determination of the first consumption value is based on an operator's selection of a time period saved to a memory of controller 150 (e.g., memory 320 of controller 150). In other embodiments, determination of the first consumption value is based on an operator's input of a new time period (i.e., a time period not saved to a memory of controller 150). As described above, the first consumption value may be determined based on at least a first predicted value and a second predicted value, wherein the first predicted value is indicative of an amount of energy required to condition the enclosed space to the first comfort temperature from the current temperature and the second predicted value is indicative of an amount of energy required to, upon conditioning the enclosed space to the first comfort temperature, maintain the first comfort temperature for the time period. In certain embodiments, the first predicted value is calculated based at least on a predicted condition of the enclosed space and the first comfort temperature. As described above, the predicted condition of the enclosed space may be determined based on systems and methods described in U.S. application Ser. No. 15/967,848. In some embodiments, the second predicted value is calculated based at least on the first comfort temperature and forecasted weather data corresponding to the time period. In some embodiments, forecasted weather data is received via the interface of controller 150 from one or more sources that may include the following: operator input, the National Weather Service, and forecasting applications such as AccuWeather.

In further explanation of step 206, the following example is provided. An HVAC system operator may desire to run the HVAC unit at a temperature of 71° F. for the entire month of July 2019. In such example, 71° F. is the first comfort temperature and the month of July 2019 is the time period. Controller 150 may predict a consumption value (e.g., an amount of energy) indicating the amount of energy required to maintain a temperature of 71° F. for July 2019. In order to make such prediction, controller 150 may first determine an amount of energy required to condition enclosed space 140 from 75° F. (current temperature) to 71° F. (first comfort temperature) and, upon making such determination, further determine an amount of energy required to maintain 71° F. within enclosed space 140 for the month of July 2019. As described above, determining an amount of energy required to maintain the comfort temperature (e.g., 71° F.) for a time period (e.g., July 2019) may be based on forecasted weather data. In some embodiments, the method 200 proceeds to a step 208 in response to determining the first consumption value.

At step 208, HVAC system 100 determines an economic value corresponding to the first energy consumption value. Such determination may be made by controller 150. In certain embodiments, HVAC system 100 uses current electricity rate information to determine the corresponding economic value. As described above, current rate information may be saved to controller 150. In other embodiments, rate information may be obtained by controller 150. For example, controller 150 may be programmed to store login credentials associated with an operator's electricity provider account and controller 150 may use these credentials to obtain current rate information for enclosed space 140. Although this disclosure describes particular manners of obtaining rate information, this disclosure recognizes obtaining rate information from any suitable source. If at step 206 the first consumption value is determined to be 2000 kWh and the current rate is 9.3 cents per kWh, HVAC system 100 may calculate an economic value of $186.00 for the first energy consumption value. In other embodiments, the economic value may correspond to a number of utility credits. In some embodiments, the method 200 may proceed to an end step 210. In other embodiments, the method 200 may proceed to step 221 of FIG. 2B.

FIG. 2B illustrates a method of operation for an HVAC system (e.g., HVAC system 100 of FIG. 1). This disclosure recognizes that one or more steps of method 220 may be performed by a controller of the HVAC system (e.g., controller 150 of HVAC system 100). The method 220 may begin at a step 221 and proceed to a step 222. At step 222, HVAC system 100 receives a second comfort temperature (e.g., 72° F.) indicating a desired temperature of enclosed space 140. The second comfort temperature (e.g., 72° F.) is a temperature different than the first comfort temperature (e.g., 71° F.). The second comfort temperature may be received by an interface of controller 150. In some embodiments, the interface receives the second comfort temperature based on input from an operator of HVAC system 100. In other embodiments, the interface receives the second comfort temperature based on input from a manufacturer of HVAC system 100. In some embodiments, the second comfort temperature may be derived from the first comfort temperature. As an example, the method may be pre-configured to analyze a plurality of second comfort temperatures within X degrees of the first comfort temperature. In an embodiment, if the first comfort temperature is 71° F. and X is configured to 2° F., the method may evaluate 69° F., 70° F., 72° F., and 73° F. as second comfort temperatures. The method 220 may proceed to a step 224 upon receiving the second comfort temperature.

At step 224, HVAC system 100 determines a second consumption value indicating a predicted amount of energy required to maintain the second comfort temperature for a particular time period. In certain instances, the time period used in the determination made at step 206 is the same time period used in the determination made at step 224. For example, an operator may wish to determine the cost to run HVAC system 100 at a comfort temperature of 72° F. for the entire month of July 2019. In such example, 72° F. is the second comfort temperature and the month of July 2019 is the time period.

In certain embodiments, the second consumption value is determined based on at least a third predicted value and a fourth predicted value, wherein the third predicted value is indicative of an amount of energy required to condition the enclosed space to the second comfort temperature (e.g., 72° F.) from the current temperature (e.g., 75° F.) and the fourth predicted value is indicative of an amount of energy required to maintain the second comfort temperature for the time period (e.g., June 2019) upon conditioning the enclosed space to the second comfort temperature. In some embodiments, the third predicted value is calculated based at least on a predicted condition of the enclosed space and the second comfort temperature. As described above, the predicted condition of the enclosed space may be determined based on systems and methods described in U.S. application Ser. No. 15/967,848. In certain embodiments, the fourth predicted value is calculated based at least on the second comfort temperature and the forecasted weather data corresponding to the time period.

Taking the examples above, the second predicted value is indicative of the amount of energy required to condition the enclosed space from 75° F. to 74° F., while the second predicted value is indicative of the amount of energy required to maintain the enclosed space at 74° F. for the month of July 2019. In some embodiments, the method 200 proceeds to a step 226 upon determining the second energy consumption value.

At step 226, HVAC system 100 determines an economic value corresponding to the second energy consumption value. As described above, HVAC system 100 uses current electricity rate information to determine the corresponding economic value. As is also described above, HVAC system 100 may receive or obtain current electricity rate information. If at step 224 the second consumption value is determined to be 1850 kWh and the current rate is 9.3 cents per kWh, HVAC system 100 may calculate an economic value of $172.05 for the second energy consumption value. In some embodiments, the method 200 proceeds to a step 228 upon determining the economic value corresponding to second energy consumption value.

At step 228, HVAC system 100 determines a difference between the first energy consumption value and the second energy consumption value. Taking the examples above, the difference between the first energy consumption value of 2000 kWh and the second energy consumption value of 1850 kWh is 150 kWh. In some embodiments, the method 200 proceeds to a step 230 upon determining the difference between the first energy consumption value and the second energy consumption value. Although this disclosure describes and depicts calculating a difference between determined consumption values, this disclosure also recognizes that HVAC system 100 may determine the difference between economic values corresponding to the first and second energy consumption values. For example, HVAC system 100 may instead calculate the difference between the first economic value and the second economic value at step 228. In such example, HVAC system may determine the difference to be $13.95. In some embodiments, the method 200 proceeds to step 230 upon determining a difference between the first energy consumption value and the second energy consumption value.

At step 230, HVAC system 100 determines whether the difference between the first energy consumption value and the second energy consumption value is less than a predetermined threshold. As described above, the predetermined threshold may be stored to a memory of controller 150. As is also described above, the predetermined threshold may be programmed by an operator and/or a manufacturer of HVAC system 100. In some embodiments, the predetermined threshold may ensure use of the first comfort temperature (which may correspond to the operator's preferred temperature from a comfort perspective) unless the second comfort temperature provides at least a threshold level of energy or cost savings. As an example, in some embodiments, the predetermined threshold is a value corresponding to a unit of energy (e.g., 50 kWh, such that the first comfort temperature would be used unless the second comfort temperature provides at least 50 kWh energy savings). In other embodiments, the predetermined threshold is a value corresponding to a cost of energy (e.g., $15.00, such that the first comfort temperature would be used unless the second comfort temperature provides at least $15.00 cost savings). The predetermined threshold may be set to any suitable value, including 0 (in which case the most energy efficient or cost-effective of the candidate comfort temperatures would be used). Additionally, in certain embodiments, the predetermined threshold may vary (linearly or non-linearly) depending on the difference between the first and second comfort temperatures. For example, the predetermined threshold may require more energy or cost savings to change the comfort temperature by 3° F. (e.g., the predetermined threshold may be 100 kWh or $20) than would be required to change the comfort temperature by only 1° F. (e.g., the predetermined threshold may be 50 kWh or $15.00).

If at step 230, HVAC system 100 determines that the difference between the first energy consumption value and the second energy consumption value is less than a predetermined threshold, the method 220 proceeds to a step 232. If, however, HVAC system 100 determines at step 230 that the difference between the first energy consumption value and the second energy consumption value is not less than the predetermined threshold, the method 220 may proceed to a step 236. Taking the above example regarding the first and the second consumption values, the method 220 may proceed to step 236 because the difference between the first and the second consumption is 150 kWh and 150 kWh is greater than (i.e., not less than) the predetermined threshold of 50 kWh. At step 236, HVAC system 100 selects the second comfort temperature (e.g., 72° F.) based on the difference between the first and the second consumption values being greater than the predetermined threshold. The method 220 then proceeds to a step 238 wherein HVAC system 100 is operated according to the selected second comfort temperature.

In comparison, the method 220 would not have proceeded to step 236 if HVAC system 100 instead compared the difference between the costs of the first and the second consumption values to a $15.00 predetermined cost threshold. This is because the difference between the costs of the first and the second consumption values is $13.95 and $13.95 is less than the $15.00 predetermined cost threshold. In this such case, the method 220 may instead proceed from step 230 to a step 232. At step 232, HVAC system 100 selects the first comfort temperature (e.g., 71° F.) based on the difference between the costs of the first and the second consumption values being less than the predetermined cost threshold. The method 220 then proceeds to a step 24 wherein HVAC system 100 is operated according to the selected first comfort temperature.

Upon operating HVAC system 100 according to one of the first comfort temperature and the second temperature, the method 220 may proceed to an end step 240.

The methods 200 and 220 may include one or more additional steps in some embodiments. Although this disclosure describes and depicts certain steps of methods 200 and 220, this disclosure recognizes that methods 200 and 220 may comprise any suitable step and/or omit any described/depicted step.

FIG. 3 illustrates an example controller 300 of HVAC system 100, according to certain embodiments of the present disclosure. In some embodiments, controller 300 may be an example of controller 150 described herein in relation to FIG. 1. Controller 300 may comprise one or more interfaces 310, memory 320, and one or more processors 330. Interface 310 receives input (e.g., sensor data or system data), sends output (e.g., data, instructions), processes the input and/or output, and/or performs other suitable operation. Interface 310 may comprise hardware and/or software. As an example, interface 310 receives information (e.g., temperature, operation, speed, pressure information) about one or more components of systems 100 (e.g., via sensors).

Memory (or memory unit) 320 stores information. As an example, memory 320 may store method 300. Memory 320 may comprise one or more non-transitory, tangible, computer-readable, and/or computer-executable storage media. Examples of memory 320 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (e.g., a server and/or cloud storage and processing), and/or other computer-readable medium.

Processor 330 may include any suitable combination of hardware and software implemented in one or more modules to execute instructions and manipulate data to perform some or all of the described functions of controller 300. In some embodiments, processor 330 may include, for example, one or more computers, one or more central processing units (CPUs), one or more microprocessors, one or more applications, one or more application specific integrated circuits (ASICs), one or more field programmable gate arrays (FPGAs), and/or other logic.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method for operating a heating, ventilation, and air conditioning ("HVAC") system, the method comprising:
   determining, by at least one controller of the HVAC system, a current temperature of an enclosed space;
   receiving, by the at least one controller, a first comfort temperature indicating a first desired temperature of the enclosed space;
   determining, by the at least one controller, based on a selection of a time period, a first consumption value indicating a predicted amount of energy required to maintain the first comfort temperature for the time period, wherein:
      the first consumption value is determined based at least on a first predicted value and a second predicted value;
      the first predicted value is indicative of an amount of energy required to condition the enclosed space to the first comfort temperature from the current temperature, the first predicted value being calculated based at least on a predicted condition of the enclosed space and the first comfort temperature; and
      the second predicted value is indicative of an amount of energy required to, upon conditioning the enclosed space to the first comfort temperature, maintain the first comfort temperature for the time period, the second predicted value being calculated based at least on the first comfort temperature and forecasted weather data;
   receiving, by the at least one controller, a second comfort temperature indicating a second desired temperature of the enclosed space, the second comfort temperature being different than the first comfort temperature;
   determining, by the at least one controller, based on the selection of the time period, a second consumption value indicating a predicted amount of energy required to maintain the second comfort temperature for the time period, wherein:
      the second consumption value is determined based at least on a third predicted value and a fourth predicted value;
      the third predicted value is indicative of an amount of energy required to condition the enclosed space to the second comfort temperature from the current temperature, the second predicted value being calculated based at least on a predicted condition of the enclosed space and the second comfort temperature; and
      the fourth predicted value is indicative of an amount of energy required to, upon conditioning the enclosed space to the second comfort temperature, maintain the second comfort temperature for the time period, the fourth predicted value being calculated based at least on the second comfort temperature and the forecasted weather data; and operating, by the at least one controller, the HVAC system according to at least one of the first energy consumption value and the second energy consumption value.

2. The method of claim 1, wherein the predicted condition of the enclosed space is determined by:
   obtaining, by the at least one controller, a first data set comprising a plurality of lag values, the plurality of lag values associated with one or more variables related to the HVAC system, each lag value corresponding to a respective time within a lag time period, the lag time period beginning prior to the current time;
   wherein the one or more variables associated with the HVAC system comprise one or more of:
      an indoor temperature;
      an ambient temperature;
      a weather forecast;
      a cooling set point;
      a heating set point;
      a cooling demand;
      a heating demand;
      an indoor humidity;
      a total capacity;
      a sensible capacity;
      a compressor frequency;
      an airflow rate;
      an input voltage;
      an input current;
      a simulated power; and
      a measured power;
   selecting, by the at least one controller, a second data set comprising a subset of the lag values from the first data set, wherein the subset excludes each lag values corresponding to a variance inflation factor exceeding a variability threshold;
applying, by the at least one controller, an ordinary least squares (OLS) linear regression to the second data set; and
applying, by the at least one controller, a 10-fold cross validation technique to the second data set, wherein the 10-fold cross validation technique is an L1-Norm Regularized regression model.

3. The method of claim 1, further comprising:
determining, by the at least one controller, an economic value for the first energy consumption value.

4. The method of claim 1, further comprising:
determining, by at least one the controller, a difference between the first energy consumption value and the second energy consumption value.

5. The method of claim 4, further comprising:
determining, by the at least one controller, an economic value of the difference between the first predicted energy consumption value and the second energy consumption value.

6. The method of claim 4, further comprising:
selecting, by the at least one controller, at least one of the first comfort temperature and the second comfort temperature, wherein the selection is based at least on the difference between the first energy consumption value and the second energy consumption value and a predetermined threshold; and
operating, by the at least one controller, the HVAC system according to the selection.

7. A controller for a heating, ventilation, and air conditioning ("HVAC") system, the controller comprising processing circuitry and a computer readable storage medium comprising instructions that, when executed by the processing circuitry, cause the controller to:
determine a current temperature of an enclosed space;
receive a first comfort temperature indicating a first desired temperature of the enclosed space;
determine, based on a selection of a time period, a first consumption value indicating a predicted amount of energy required to maintain the first comfort temperature for the time period, wherein:
the first consumption value is determined based at least on a first predicted value and a second predicted value;
the first predicted value is indicative of an amount of energy required to condition the enclosed space to the first comfort temperature from the current temperature, the first predicted value being calculated based at least on a predicted condition of the enclosed space and the first comfort temperature; and
the second predicted value is indicative of an amount of energy required to, upon conditioning the enclosed space to the first comfort temperature, maintain the first comfort temperature for the time period, the second predicted value being calculated based at least on the first comfort temperature and forecasted weather data;
receive a second comfort temperature indicating a second desired temperature of the enclosed space, the second comfort temperature being different than the first comfort temperature;
determine based on the selection of the time period, a second consumption value indicating a predicted amount of energy required to maintain the second comfort temperature for the time period, wherein:
the second consumption value is determined based at least on a third predicted value and a fourth predicted value;
the third predicted value is indicative of an amount of energy required to condition the enclosed space to the second comfort temperature from the current temperature, the second predicted value being calculated based at least on a predicted condition of the enclosed space and the second comfort temperature; and
the fourth predicted value is indicative of an amount of energy required to, upon conditioning the enclosed space to the second comfort temperature, maintain the second comfort temperature for the time period, the fourth predicted value being calculated based at least on the second comfort temperature and the forecasted weather data; and operate, by the at least one controller, the HVAC system according to at least one of the first energy consumption value and the second energy consumption value.

8. The controller of claim 7, wherein the controller further comprises instructions that, when executed by the processor, cause the controller to:
determine the predicted condition of the enclosed space by:
obtaining a first data set comprising a plurality of lag values, the plurality of lag values associated with one or more variables related to the HVAC system, each lag value corresponding to a respective time within a lag time period, the lag time period beginning prior to the current time;
wherein the one or more variables associated with the HVAC system comprise one or more of:
an indoor temperature;
an ambient temperature;
a weather forecast;
a cooling set point;
a heating set point;
a cooling demand;
a heating demand;
an indoor humidity;
a total capacity;
a sensible capacity;
a compressor frequency;
an airflow rate;
an input voltage;
an input current;
a simulated power; and
a measured power;
selecting a second data set comprising a subset of the lag values from the first data set, wherein the subset excludes each lag values corresponding to a variance inflation factor exceeding a variability threshold;
applying an ordinary least squares (OLS) linear regression to the second data set; and
applying a 10-fold cross validation technique to the second data set, wherein the 10-fold cross validation technique is an L1-Norm Regularized regression model.

9. The controller of claim 7, wherein the controller further comprises instructions that, when executed by the processor, cause the controller to:
determine an economic value for the first energy consumption value.

10. The controller of claim 7, wherein the controller further comprises instructions that, when executed by the processor, cause the controller to:

determine a difference between the first energy consumption value and the second energy consumption value.

11. The controller of claim 10, wherein the controller further comprises instructions that, when executed by the processor, cause the controller to:
determine an economic value of the difference between the first predicted energy consumption value and the second energy consumption value.

12. The controller of claim 10, wherein the controller further comprises instructions that, when executed by the processor, cause the controller to:
select at least one of the first comfort temperature and the second comfort temperature, wherein the selection is based at least on the difference between the first energy consumption value and the second energy consumption value and a predetermined threshold; and
operate the HVAC system according to the selection.

13. A heating, ventilation, and air condition ("HVAC") system operable to condition an enclosed space, the HVAC system comprising:
one or more heating components operable to heat the enclosed space when the HVAC system is in a heating mode;
one or more cooling components operable to cool the enclosed space when the HVAC system is in a cooling mode;
a controller comprising processing circuitry and a computer readable storage medium comprising instructions that, when executed by the processing circuitry, cause the controller to:
determine a current temperature of an enclosed space;
receive a first comfort temperature indicating a first desired temperature of the enclosed space;
determine, based on a selection of a time period, a first consumption value indicating a predicted amount of energy required to maintain the first comfort temperature for the time period, wherein:
the first consumption value is determined based at least on a first predicted value and a second predicted value;
the first predicted value is indicative of an amount of energy required to condition the enclosed space to the first comfort temperature from the current temperature, the first predicted value being calculated based at least on a predicted condition of the enclosed space and the first comfort temperature; and
the second predicted value is indicative of an amount of energy required to, upon conditioning the enclosed space to the first comfort temperature, maintain the first comfort temperature for the time period, the second predicted value being calculated based at least on the first comfort temperature and forecasted weather data;
receive a second comfort temperature indicating a second desired temperature of the enclosed space, the second comfort temperature being different than the first comfort temperature;
determine based on the selection of the time period, a second consumption value indicating a predicted amount of energy required to maintain the second comfort temperature for the time period, wherein:
the second consumption value is determined based at least on a third predicted value and a fourth predicted value;
the third predicted value is indicative of an amount of energy required to condition the enclosed space to the second comfort temperature from the current temperature, the second predicted value being calculated based at least on a predicted condition of the enclosed space and the second comfort temperature; and
the fourth predicted value is indicative of an amount of energy required to, upon conditioning the enclosed space to the second comfort temperature, maintain the second comfort temperature for the time period, the fourth predicted value being calculated based at least on the second comfort temperature and the forecasted weather data; and
operate, by the at least one controller, the HVAC system according to at least one of the first energy consumption value and the second energy consumption value.

14. The HVAC system of claim 13, wherein the controller further comprises instructions that, when executed by the processor, cause the controller to:
determine the predicted condition of the enclosed space by:
obtaining a first data set comprising a plurality of lag values, the plurality of lag values associated with one or more variables related to the HVAC system, each lag value corresponding to a respective time within a lag time period, the lag time period beginning prior to the current time;
wherein the one or more variables associated with the HVAC system comprise one or more of:
an indoor temperature;
an ambient temperature;
a weather forecast;
a cooling set point;
a heating set point;
a cooling demand;
a heating demand;
an indoor humidity;
a total capacity;
a sensible capacity;
a compressor frequency;
an airflow rate;
an input voltage;
an input current;
a simulated power; and
a measured power;
selecting a second data set comprising a subset of the lag values from the first data set, wherein the subset excludes each lag values corresponding to a variance inflation factor exceeding a variability threshold;
applying an ordinary least squares (OLS) linear regression to the second data set; and
applying a 10-fold cross validation technique to the second data set, wherein the 10-fold cross validation technique is an L1-Norm Regularized regression model.

15. The HVAC system of claim 13, wherein the controller further comprises instructions that, when executed by the processor, cause the controller to:
determine a difference between the first energy consumption value and the second energy consumption value.

16. The HVAC system of claim 15, wherein the controller further comprises instructions that, when executed by the processor, cause the controller to:
determine an economic value of the difference between the first predicted energy consumption value and the second energy consumption value.

17. The HVAC system of claim 15, wherein the controller further comprises instructions that, when executed by the processor, cause the controller to:
   select at least one of the first comfort temperature and the second comfort temperature, wherein the selection is based at least on the difference between the first energy consumption value and the second energy consumption value and a predetermined threshold; and
   operate the HVAC system according to the selection.

* * * * *